US011393135B1

(12) United States Patent
Ferguson et al.

(10) Patent No.: US 11,393,135 B1
(45) Date of Patent: Jul. 19, 2022

(54) MODIFYING OBJECTS IN A GRAPHICAL ENVIRONMENT

(71) Applicant: Apple Inc., Cupertino, CA (US)

(72) Inventors: Stuart Harl Ferguson, Sunnyvale, CA (US); James Graham McCarter, Erie, CO (US); Richard Ignatius Punsal Lozada, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/148,810

(22) Filed: Jan. 14, 2021

Related U.S. Application Data

(60) Provisional application No. 62/983,134, filed on Feb. 28, 2020.

(51) Int. Cl.
*G06T 7/149* (2017.01)
*G06T 11/00* (2006.01)
*G06F 3/048* (2013.01)

(52) U.S. Cl.
CPC ............ *G06T 11/001* (2013.01); *G06T 7/149* (2017.01)

(58) Field of Classification Search
CPC ....... G06T 7/149; G06T 11/001; G06T 19/20; G06T 19/006; G06T 2219/2012; G06T 7/00; G06T 7/0002; G06T 7/0016; G06T 7/174; G06T 7/251; G06T 7/30–7/32; G06F 3/0481; G06F 3/0482; G06F 3/016; G06F 3/0414; G06F 3/0485; G06F 3/0488; G06F 3/04883; G09G 5/00; G09G 5/003; G09G 5/006; G09G 5/02; G09G 2320/10; G09G 2320/103
See application file for complete search history.

(56) References Cited

U.S. PATENT DOCUMENTS

| | | | |
|---|---|---|---|
| 7,812,850 B1 | 10/2010 | Nelson | |
| 10,339,721 B1* | 7/2019 | Dascola | ............. G06F 3/04883 |
| 10,884,591 B2* | 1/2021 | Missig | ................. G06F 3/0488 |
| 11,182,980 B1* | 11/2021 | Nguyen | ................ G06T 19/20 |
| 2009/0251462 A1 | 10/2009 | Kaytis et al. | |
| 2017/0011549 A1 | 1/2017 | Pinskiy et al. | |
| 2019/0265828 A1* | 8/2019 | Hauenstein | ........... G06F 3/0416 |
| 2019/0339804 A1* | 11/2019 | Gleeson | ............. G06F 3/04847 |
| 2020/0201472 A1* | 6/2020 | Bernstein | ............. G06F 3/0416 |

\* cited by examiner

*Primary Examiner* — Wesner Sajous
(74) *Attorney, Agent, or Firm* — Fernando & Partners, LLP

(57) ABSTRACT

Various implementations disclosed herein include devices, systems, and methods for using a deformation model of a first object that is within a degree of similarity to a second object instead of creating a deformation model for the second object. In some implementations, a method includes obtaining an input to instantiate a first object in a graphical environment. The first object is characterized by a first set of response parameter values. A second object is identified. The second object is characterized by a second set of response parameter values that are within a threshold range of the first set of response parameter values. A deformation model of the second object is obtained. The deformation model defines a change in a visual property of the second object based on a condition. A change in a visual property of the first object is displayed based on the deformation model of the second object.

20 Claims, 7 Drawing Sheets

MODIFYING OBJECTS IN A GRAPHICAL ENVIRONMENT

CROSS-REFERENCE TO RELATED APPLICATION

This application claims the benefit of U.S. Provisional Patent App. No. 62/983,134, filed on Feb. 28, 2020, which is incorporated by reference in its entirety.

TECHNICAL FIELD

The present disclosure generally relates to modifying an object in a graphical environment.

BACKGROUND

Some devices are capable of generating and presenting graphical environments that include many objects. These objects may mimic real world objects. These environments may be presented on mobile communication devices.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
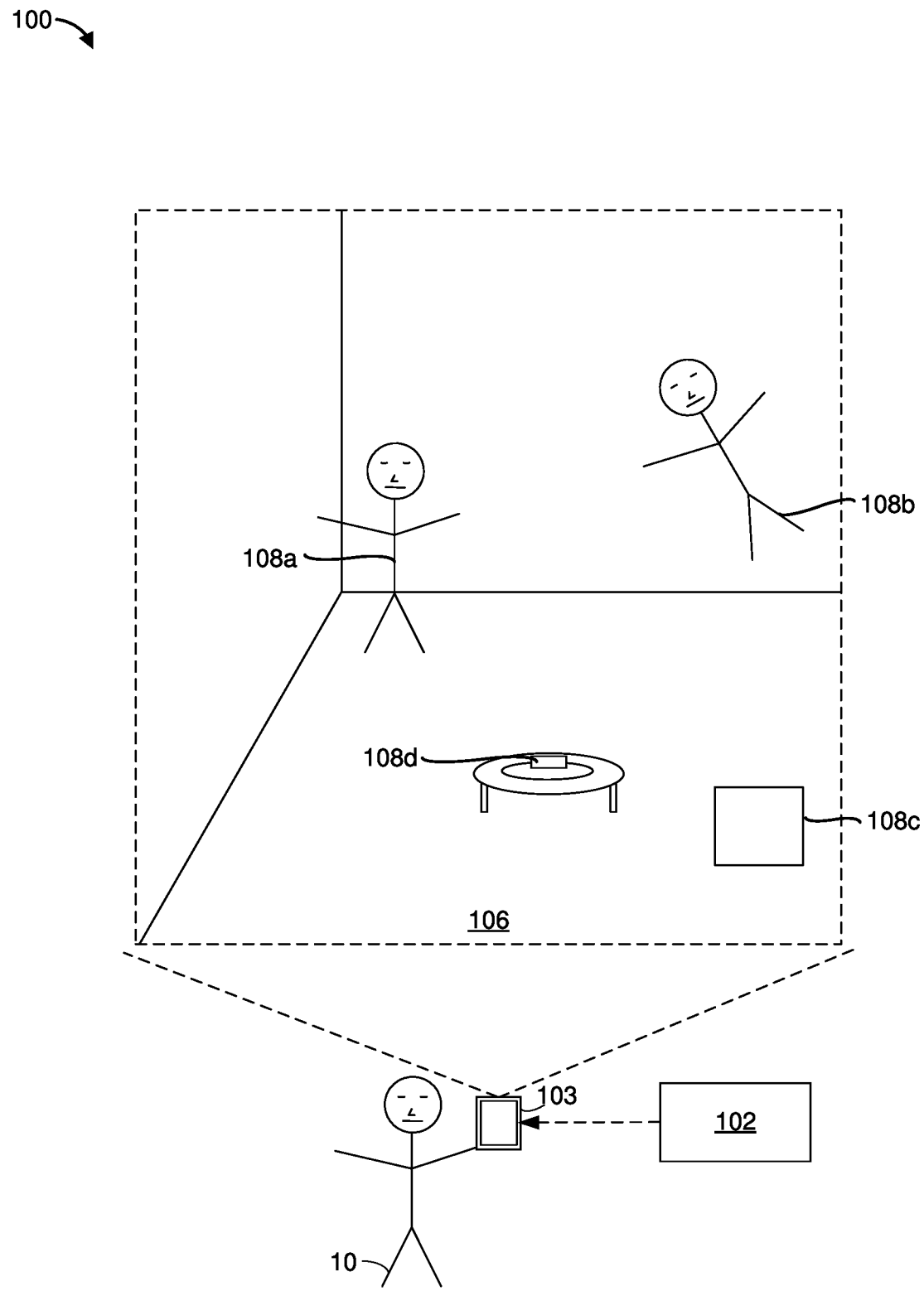
FIG. 1 depicts an exemplary system for use in various graphic technologies.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for using a deformation model of a first object that is within a degree of similarity to a second object instead of creating a deformation model for the second object. In some implementations, a method includes obtaining an input to instantiate a first object in a graphical environment. The first object is characterized by a first set of response parameter values. A second object is identified. The second object is characterized by a second set of response parameter values that are within a threshold range of the first set of response parameter values. A deformation model of the second object is obtained. The deformation model defines a change in a visual property of the second object based on a condition. A change in a visual property of the first object is displayed based on the deformation model of the second object.

In accordance with some implementations, a device includes one or more processors, a non-transitory memory, and one or more programs. In some implementations, the one or more programs are stored in the non-transitory memory and are executed by the one or more processors. In some implementations, the one or more programs include instructions for performing or causing performance of any of the methods described herein. In accordance with some implementations, a non-transitory computer readable storage medium has stored therein instructions that, when executed by one or more processors of a device, cause the device to perform or cause performance of any of the methods described herein. In accordance with some implementations, a device includes one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, an extended reality (XR) environment refers to a wholly or partially simulated environment that people sense and/or interact with via an electronic system. In XR, a subset of a person's physical motions, or representations thereof, are tracked, and, in response, one or more characteristics of one or more virtual objects simulated in the XR environment are adjusted in a manner that comports with at least one law of physics. For example, an XR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in an XR environment may be made in response to representations of physical motions (e.g., vocal commands).

A person may sense and/or interact with an XR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some XR environments, a person may sense and/or interact only with audio objects.

Examples of XR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various XR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

In various implementations, a device directs an object to perform one or more actions in order to effectuate (e.g., advance, satisfy, complete, and/or achieve) one or more objectives (e.g., results and/or goals). The object may be part of a computer graphical environment such as an extended reality (XR) environment. In some implementations, the object (hereafter "XR object") is associated with a particular objective, and the XR object performs actions that improve the likelihood of effectuating that particular objective.

The present disclosure provides methods, systems, and/or devices for applying a deformation model for one XR object to another XR object rather than creating a deformation model for the other XR object. In some implementations, the need to generate new deformation models for a variety of XR objects is reduced.

In some implementations, a change in a visual property for a first XR object is displayed by applying a deformation model for a second XR object that is within a degree of similarity to the first XR object when a deformation model does not exist for the first object. An ontology may be used to determine one or more properties of the first XR object. A second XR object that has similar properties to the first XR object and that has a deformation model may be identified.

In some implementations, an XR object performs a sequence of actions. In some implementations, a device determines (e.g., generates and/or synthesizes) the actions for the XR object. In some implementations, the actions generated for the XR object are within a degree of similarity to actions that a corresponding entity (e.g., a character, an equipment, and/or a thing) performs as described in fictional material or as exists in a physical environment. For example, in some implementations, an XR object that corresponds to a fictional action figure performs the action of flying in an XR environment because the corresponding fictional action figure flies as described in the fictional material. Similarly, in some implementations, an XR object that corresponds to a physical drone performs the action of hovering in an XR environment because the corresponding physical drone hovers in a physical environment. In some implementations, the device obtains the actions for the XR object. For example, in some implementations, the device receives the actions for the XR object from a separate device (e.g., a remote server) that determines the actions.

In some implementations, an XR object corresponding to a character is referred to as an XR character, and an objective of the XR character is referred to as a character objective. In such implementations, the XR character performs actions in order to effectuate the character objective.

In some implementations, an XR object corresponding to equipment (e.g., a rope for climbing, an airplane for flying, a pair of scissors for cutting) is referred to as an XR equipment, and an objective of the XR equipment is referred to as an equipment objective. In such implementations, the XR equipment performs actions in order to effectuate the equipment objective.

In some implementations, an XR object corresponding to an environment (e.g., weather pattern, features of nature and/or gravity level) is referred to as an XR environment, and an objective of the XR environment is referred to as an environmental objective.

The present disclosure provides methods, systems, and/or devices in which deformation models are generated for a set of XR objects. In some implementations, a deformation model defines a characteristic response of an XR object (e.g., a change in a visual property of the XR object) that results from the occurrence of a condition (e.g., a condition associated with the XR object or with an XR environment). When the condition occurs in association with a first XR object that does not have an associated deformation model, a second XR object is identified that is similar to the first XR object and that has an associated deformation model. In some implementations, the deformation model that is associated with the second XR object is applied to the first XR object. Based on the application of the deformation model, a change in a visual property of the first XR object is displayed. Accordingly, in some implementations, the need to generate a deformation model for the first XR object is avoided.

FIG. 1 is a block diagram of an example operating environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes a controller 102 and an electronic device 103. In the example of FIG. 1, the electronic device 103 is being held by a user 10. In some implementations, the electronic device 103 includes a smartphone, a tablet, a laptop, or the like.

As illustrated in FIG. 1, the electronic device 103 presents an extended reality (XR) environment 106 (e.g., a graphical environment or a computer graphics environment). In some implementations, the XR environment 106 is generated by the controller 102 and/or the electronic device 103. In some implementations, the XR environment 106 includes a virtual environment that is a simulated replacement of a physical environment. In other words, in some implementations, the XR environment 106 is synthesized by the controller 102 and/or the electronic device 103. In such implementations, the XR environment 106 is different from a physical environment in which the electronic device 103 is located. In some implementations, the XR environment 106 includes an augmented environment that is a modified version of a physical environment. For example, in some implementations, the controller 102 and/or the electronic device 103 modify (e.g., augment) the physical environment in which the electronic device 103 is located to generate the XR environment 106. In some implementations, the controller 102 and/or the electronic device 103 generate the XR environment 106 by simulating a replica of the physical environment in which the electronic device 103 is located. In some implementations, the controller 102 and/or the electronic device 103 generate the XR environment 106 by removing and/or adding items from the simulated replica of the physical environment in which the electronic device 103 is located.

In some implementations, the XR environment 106 includes various XR objects (e.g., graphical objects) that correspond to various characters and/or equipment, such as a boy action figure representation 108a, a girl action figure representation 108b, a robot representation 108c, and a cheese representation 108d. In some implementations, the XR objects represent characters from fictional materials, such as movies, video games, comics, and novels. For example, the boy action figure representation 108a represents a boy action figure character from a fictional comic, and the girl action figure representation 108b represents a girl action figure character from a fictional video game. In some implementations, the XR environment 106 includes XR objects that represent characters from different fictional materials (e.g., from different movies, games, comics, and/or novels). In various implementations, the XR objects represent physical articles. For example, in some implementations, the XR objects represent equipment (e.g., machinery such as planes, tanks, robots, cars, etc.). In the example of FIG. 1, the robot representation 108c represents a robot and the cheese representation 108d represents a block of cheese. In some implementations, the XR objects represent entities (e.g., equipment) from fictional materials. In some implementations, the XR objects represent entities from a physical environment, including things located inside and/or outside of the XR environment 106.

In various implementations, an XR object is manipulated to exhibit one or more actions that effectuate (e.g., complete, satisfy, and/or achieve) one or more objectives associated with the XR object. In some implementations, the XR object is manipulated to exhibit a sequence of actions. In some implementations, the controller 102 and/or the electronic device 103 determine the actions for the XR object. In some implementations, the actions of an XR object are within a degree of similarity to actions that the corresponding entity (e.g., character, equipment or thing) performs in the fictional material. In the example of FIG. 1, the girl action figure representation 108b is performing the action of flying (e.g., because the corresponding girl action figure character is capable of flying, and/or the girl action figure character frequently flies in the fictional materials). In some implementations, the controller 102 and/or the electronic device 103 obtain the actions for the XR objects. For example, in some implementations, the controller 102 and/or the electronic device 103 receive the actions for the XR objects from a remote server that determines (e.g., selects) the actions.

In some implementations, the XR environment 106 is generated based on a user input from the user 10. For example, in some implementations, the electronic device 103 receives a user input indicating a terrain for the XR environment 106. In such implementations, the controller 102 and/or the electronic device 103 configure the XR environment 106 such that the XR environment 106 includes the terrain indicated via the user input. In some implementations, the user input indicates environmental conditions for the XR environment 106. In such implementations, the controller 102 and/or the electronic device 103 configure the XR environment 106 to have the environmental conditions indicated by the user input. In some implementations, the environmental conditions include one or more of temperature, humidity, pressure, visibility, ambient light level, ambient sound level, time of day (e.g., morning, afternoon, evening, or night), and precipitation (e.g., overcast, rain, or snow). In some implementations, the user input specifies a time period for the XR environment 106. In such implementations, the controller 102 and/or the electronic device 103 maintain and present the XR environment 106 during the specified time period.

In some implementations, the controller 102 and/or the electronic device 103 determine (e.g., generate) actions for the XR objects based on a user input from the user 10. For example, in some implementations, the electronic device 103 receives a user input indicating placement of an XR object. In such implementations, the controller 102 and/or the electronic device 103 position the XR object in accordance with the placement indicated by the user input. In some implementations, the user input indicates specific actions that the XR object(s) are permitted to perform. In such implementations, the controller 102 and/or the electronic device 103 select the actions for the XR object(s) from the specific actions indicated by the user input. In some implementations, the controller 102 and/or the electronic device 103 forgo actions that are not among the specific actions indicated by the user input.

In various implementations, an animation defines a sequence of poses that collectively span a time duration. When an XR object adopts the various poses defined by an animation in a sequential manner, the XR object provides an appearance that the XR object is performing an action that is associated with the animation. For example, when the boy action figure representation 108a sequentially adopts poses defined by a walking animation, the boy action figure representation 108a provides an appearance that the boy action figure representation 108a is walking.

In various implementations, an XR object may be associated with a condition that causes it to undergo a deformation. For example, environmental conditions, such as temperature, may cause the cheese representation 108d to melt. In some implementations, the cheese representation 108d has an associated deformation model that defines a characteristic response of the cheese representation 108d (e.g., a change in a visual property of the cheese representation 108d) that results from the occurrence of a condition, e.g., melting. In some implementations, the cheese representation 108d does not have an associated deformation model that defines a change in visual properties of the cheese representation 108d when the cheese representation 108d melts.

In some implementations, when the condition (e.g., melting) occurs and the cheese representation 108d does not have an associated deformation model, another XR object is identified that is similar to the cheese representation 108d and that has an associated deformation model. An ontology may be used to determine one or more properties of the cheese representation 108d. In some implementations, an XR object is identified that has properties similar to the cheese representation 108d and that has an associated deformation model.

In some implementations, the cheese representation 108d is characterized by a first set of response parameter values. The first set of response parameter values may include, for example, a color parameter value, a texture parameter value, an elasticity parameter value, a shape parameter value, and the like. In some implementations, an XR object is identified that has a second set of response parameter values that are within a threshold range of the first set of response parameter values. For example, if the cheese representation 108d represents a block of cheese, the identified XR object may be shredded cheese.

In some implementations, when the XR object has been identified, its associated deformation model is applied to the cheese representation 108d. Based on the application of the deformation model, a change in a visual property of the cheese representation 108d is displayed when the condition occurs. For example, a deformation model for shredded cheese may be applied to the cheese representation 108d, and the cheese representation 108d may be displayed as melting based on the deformation model for shredded cheese. In some implementations, one or more visual properties (e.g., color, texture, and/or shape) of the cheese representation 108d are adjusted based on the deformation model.

In some implementations, the electronic device 103 is replaced by or is attached to a head-mountable device (HMD) worn by the user 10. The HMD presents (e.g., displays) the XR environment 106 according to various implementations. In some implementations, the HMD includes an integrated display (e.g., a built-in display) that displays the XR environment 106. In some implementations, the HMD includes a head-mountable enclosure. In various implementations, the head-mountable enclosure includes an attachment region to which another device with a display can be attached. For example, in some implementations, the electronic device 103 can be attached to the head-mountable enclosure. In various implementations, the head-mountable enclosure is shaped to form a receptacle for receiving another device that includes a display (e.g., the electronic device 103). For example, in some implementations, the electronic device 103 slides/snaps into or otherwise attaches to the head-mountable enclosure. In some implementations, the display of the device attached to the head-mountable enclosure presents (e.g., displays) the XR environment 106. In various implementations, examples of the electronic device 103 include smartphones, tablets, media players, laptops, etc.

Figure 2:
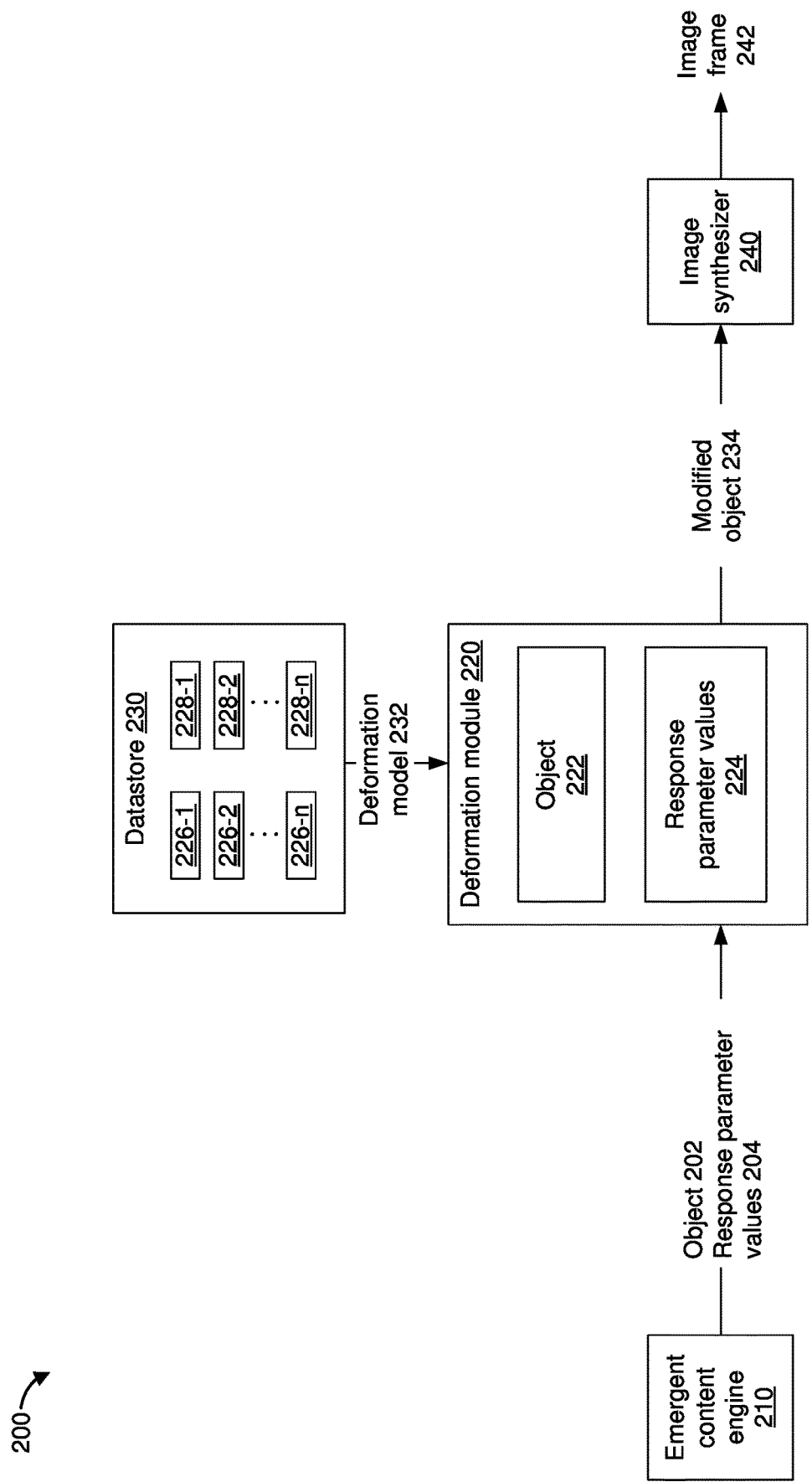
FIG. 2 illustrates an example system that displays a deformation of an object in a graphical environment according to various implementations.

FIG. 2 illustrates an example system 200 that displays a deformation of an XR object 202 (e.g., the cheese representation 108d of FIG. 1) in an XR environment according to various implementations. In some implementations, the system 200 resides at the controller 102 and/or the electronic device 103 shown in FIG. 1.

In some implementations, an emergent content engine 210 obtains an input to instantiate the XR object 202 in the XR environment. The input may be a user input received from a user (e.g., the user 10 of FIG. 1) or may be generated by another component of the system 200. In some implementations, the emergent content engine 210 generates the input to instantiate the XR object 202.

In some implementations, the XR object 202 is characterized by a set of response parameter values 204. The response parameter values 204 may characterize one or more visual properties and/or physical properties of the XR object 202. For example, if the XR object 202 is a representation of block cheese, the XR object 202 may be characterized by response parameter values 204 such as a color parameter having a value that corresponds to the color 'yellow,' a texture parameter having a value that corresponds to a smooth texture, an elasticity parameter having a value of 50/100, a shape parameter having a value that corresponds to a rectangular prism, and the like.

In some implementations, a deformation module 220 identifies an XR object 222 that is characterized by a set of response parameter values 224 that are within a threshold range of the response parameter values 204. For example, the deformation module 220 may identify an XR object representing shredded cheese and having the following response parameter values 224: a color parameter having a value that corresponds to the color yellow, a texture parameter having a value that corresponds to a smooth texture, an elasticity parameter having a value of 60/100, and a shape parameter having a value that corresponds to strands.

In some implementations, the deformation module 220 selects the XR object 222 from a plurality of candidate XR objects 226-1, 226-2, . . . , 226-n (collectively referred to as candidate XR objects 226). The candidate XR objects 226 may be characterized by respective sets of response parameter values 228-1, 228-2, . . . , 228-n (collectively referred to as sets of response parameter values 228). The sets of response parameter values 228 may be within varying degrees of similarity to the set of response parameter values 204 that characterize the XR object 202. In some implementations, the candidate XR objects 226 and the sets of response parameter values 228 are stored in a datastore 230. In some implementations, the deformation module 220 selects as the XR object 222 the candidate XR object 226 that is characterized by the set of response parameter values 228 that is most similar to the set of response parameter values 204. In some implementations, some response parameter values (e.g., texture) are prioritized over other response parameter values (e.g., shape) in determining which set of response parameter values 228 is most similar to the set of response parameter values 204.

In some implementations, the deformation module 220 obtains a deformation model 232 of the XR object 222. The deformation model 232 defines a change in a visual property of the XR object 222 based on a condition. In some implementations, the condition is a condition associated with the XR object 222, such as melting or crumpling. For example, the deformation model 232 may define a change in a visual property (e.g., texture, shape, color, etc.) that occurs when the XR object is melted or is crumpled. In some implementations, the condition is a condition (e.g., an environmental condition) associated with the XR environment. For example, the deformation model 232 may define a change in a visual property (e.g., texture, shape, color, etc.) that occurs when the temperature of the XR environment breaches a threshold, e.g., a melting point of the XR object 222. In some implementations, the deformation model 232 defines a change in a visual property of the XR object 222 in response to an interaction with a force in the XR environment, such as wind. In some implementations, the deformation model 232 defines a change in a visual property of the XR object 222 as a function of an interaction (e.g., a collision) with another XR object.

In some implementations, the system 200 displays a change in a visual property of the XR object 202 based on the deformation model 232. The change in the visual property may be displayed in response to a condition. In some implementations, the deformation module 220 applies the deformation model 232 to the XR object 202 to determine the change in the visual property of the XR object 202 when the XR object 202 is being displayed in the XR environment. The deformation module 220 may generate a modified XR object 234 that incorporates the change in the visual property of the XR object 202.

In some implementations, the deformation module 220 provides the modified XR object 234 to an image synthesizer 240, which generates an image data frame 242 that represents the XR environment with the modified XR object 234. The image synthesizer 240 may provide the image data frame 242 to a rendering and display pipeline. In some implementations, the image synthesizer 240 transmits the image data frame 242 to a device that displays the modified image data frame 242.

Figure 3:
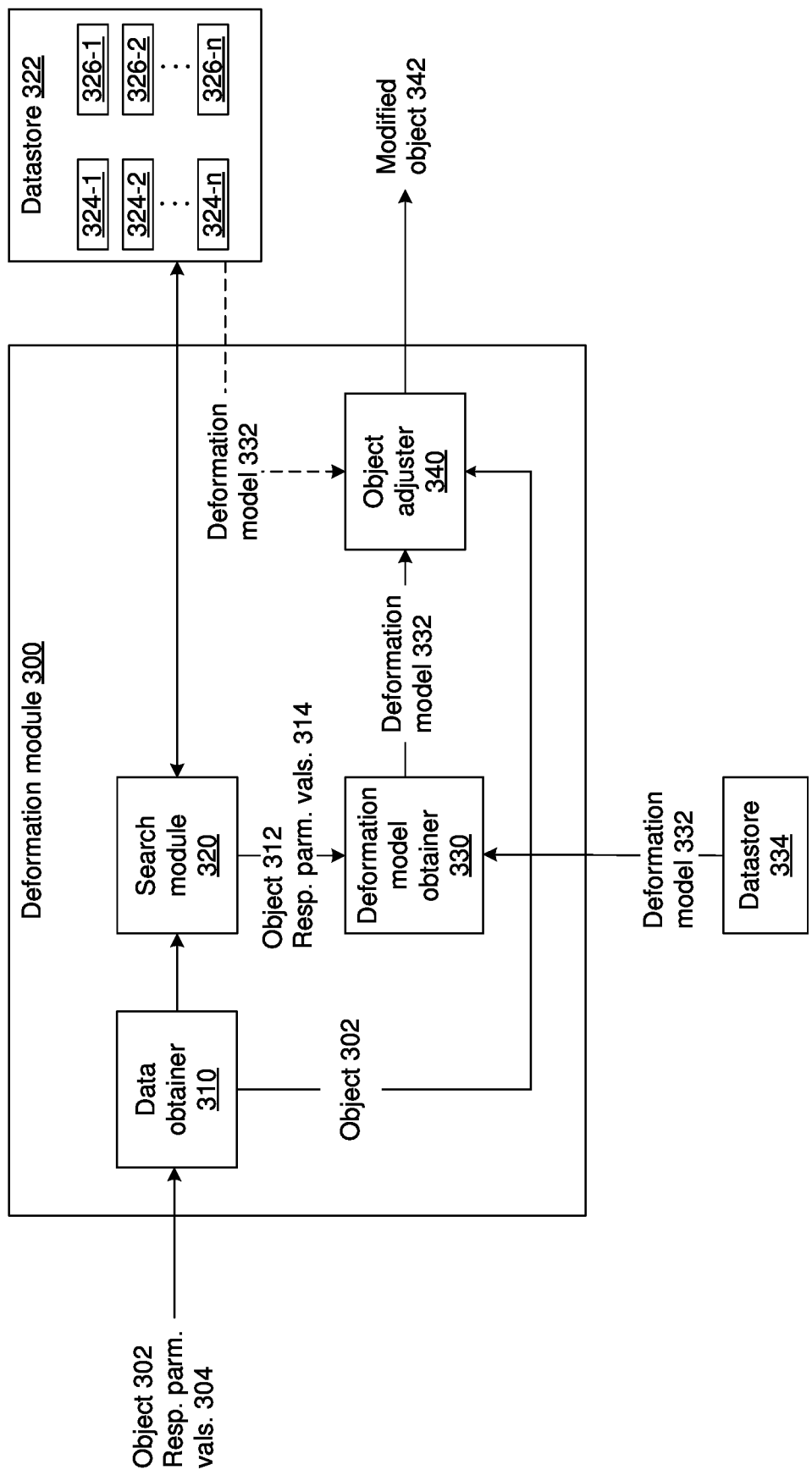
FIG. 3 is a block diagram of an example deformation module in accordance with some implementations.

FIG. 3 is a block diagram of an example deformation module 300 in accordance with some implementations. In some implementations, the deformation module 300 implements the deformation module 220 shown in FIG. 2. In various implementations, the deformation module 300 obtains (e.g., receives) an XR object 302 instantiated in an XR environment (e.g., the cheese representation 108d shown in FIG. 1). The XR object 302 is characterized by a set of response parameter values 304. In various implementations, the deformation module 300 identifies an XR object 312 that is characterized by a set of response parameter values 314 that are within a threshold range of the set of response parameter values 304. In various implementations, the deformation module 300 obtains (e.g., receives) a deformation model 332 of the XR object 312. The deformation model 316 defines a change in a visual property (e.g., texture, shape, color, etc.) of the XR object 312 based on a condition. In various implementations, the deformation module 300 displays a change in a visual property of the XR object 302 based on the deformation model 316 of the XR object 312.

In some implementations, a data obtainer 310 obtains (e.g., receives) the XR object 302. The XR object 302 may be generated, for example, by the emergent content engine 210 shown in FIG. 2. In some implementations, the XR object 302 is generated in response to an input to instantiate the XR object 302. The input to instantiate the XR object

302 may be received from a user (e.g., the user 10 shown in FIG. 1) or from another component, e.g., of the system 200. In some implementations, the emergent content engine 210 generates the input to instantiate the XR object 302.

In some implementations, the XR object 302 is characterized by the set of response parameter values 304. The response parameter values 304 may characterize one or more visual properties and/or physical properties of the XR object 302. For example, if the XR object 302 is a representation of block cheese, the XR object 302 may be characterized by response parameter values 304 such as a color parameter having a value that corresponds to the color yellow, a texture parameter having a value that corresponds to a smooth texture, an elasticity parameter having a value of 50/100, a shape parameter having a value that corresponds to a rectangular prism, and the like.

In some implementations, a search module 320 identifies the XR object 312 that is characterized by a set of response parameter values 314 that are within a threshold range of the set of response parameter values 304. For example, the search module 320 may identify an XR object representing shredded cheese and having the following response parameter values 314: a color parameter having a value that corresponds to the color yellow, a texture parameter having a value that corresponds to a smooth texture, an elasticity parameter having a value 60/100, and a shape parameter having a value that corresponds to strands.

The search module 320 may identify the XR object 312 in response to determining that the XR object 302 is not associated with a deformation model that defines a change in a visual property of the XR object 302 based on a condition. In some implementations, the search module 320 identifies the XR object 312 based on a similarity search. The similarity search may be based, for example, on the XR object 302. In some implementations, the search module 320 performs a similarity search based on the response parameter values 304 characterizing the XR object 302. For example, the search module 320 may perform a search against a datastore 322 (e.g., a product database) to identify one or more candidate XR objects 324-1, 324-2, . . . , 324-n (collectively referred to as candidate XR objects 324). The candidate XR objects 324 may be characterized by respective sets of response parameter values 326-1, 326-2, . . . , 326-n (collectively referred to as sets of response parameter values 326). The sets of response parameter values 326 may be within varying degrees of similarity to the set of response parameter values 304 that characterize the XR object 302. In some implementations, the search module 320 performs the search to return only candidate XR objects 324 whose corresponding response parameter values 326 are within a threshold range of similarity to the set of response parameter values 304 that characterize the XR object 302. In some implementations, the search module 320 selects as the XR object 312 the candidate XR object 324 that is characterized by the set of response parameter values 326 that is most similar to the set of response parameter values 304. In some implementations, some response parameter values (e.g., texture) are prioritized over other response parameter values (e.g., shape) in determining which set of response parameter values 326 is most similar to the set of response parameter values 304.

In some implementations, the search module 320 identifies the XR object 312 based on a semantic segmentation of the XR object 302. The semantic segmentation may be based on image data, for example, received from an image sensor. In some implementations, the semantic segmentation is based on depth data received from a depth sensor.

In some implementations, the search module 320 identifies the XR object 312 based on a machine-readable optical representation of the XR object 302. For example, the search module 320 may identify the XR object 312 based on a bar code associated with the XR object 302. In some implementations, the search module 320 identifies the XR object 312 based on a QR code associated with the XR object 302.

In some implementations, the set of response parameter values 314 are within a threshold range of the set of response parameter values 304 if the XR object 312 is within a degree of similarity to the XR object 302. In some implementations, the set of response parameter values 314 are within a threshold range of the set of response parameter values 304 if the degree of similarity between the XR object 312 and the XR object 302 is greater than a threshold percentage (e.g., if the XR object 312 and the XR object 302 are 90% similar). In some implementations, the set of response parameter values 314 are within a threshold range of the set of response parameter values 304 if a similarity score indicating the degree of similarity between the XR object 312 and the XR object 302 is greater than a threshold similarity score (e.g., if the similarity score is greater than 0.90).

In some implementations, a deformation model obtainer 330 obtains a deformation model 332 of the XR object 312. The deformation model 332 defines a change in a visual property of the XR object 312 based on a condition. In some implementations, the condition is a condition associated with the XR object 312, such as melting or crumpling. For example, the deformation model 332 may define a change in a visual property (e.g., texture, shape, color, etc.) that occurs when the XR object is melted or is crumpled. In some implementations, the condition is a condition (e.g., an environmental condition) associated with the XR environment. For example, the deformation model 332 may define a change in a visual property (e.g., texture, shape, color, etc.) that occurs when the temperature of the XR environment breaches a threshold, e.g., a melting point of the XR object 312. In some implementations, the deformation model 332 defines a change in a visual property of the XR object 312 in response to an interaction with a force in the XR environment, such as wind. In some implementations, the deformation model 332 defines a change in a visual property of the XR object 312 as a function of an interaction (e.g., a collision) with another XR object.

In some implementations, the deformation model obtainer 330 receives the deformation model 332 from the datastore 322. In some implementations, the deformation model obtainer 330 receives the deformation model 332 from another datastore 334. The datastore 322 and/or the datastore 334 may be accessible via a network, such as a local area network (LAN), a wide area network (WAN), an intranet, or the Internet.

In some implementations, an XR object adjuster 340 adjusts the XR object 302 based on the deformation model 332. For example, the XR object adjuster 340 may adjust a visual property of the XR object 302 based on the deformation model 332. The XR object adjuster 340 may adjust the visual property in response to a condition. In some implementations, the condition is a condition associated with the XR object 302, such as melting or crumpling. For example, the deformation model 332 may define a change in a visual property (e.g., texture, shape, color, etc.) that occurs when the XR object 302 is melted or is crumpled. In some implementations, the condition may be caused by exposure of the XR object 302 to an environmental condition associated with the XR environment. For example, when a temperature of the XR environment breaches a threshold, e.g., a melting point of the XR object 302, the XR object 302 may melt. When the XR object 302 melts in response to the temperature of the XR environment breaching the melting point of the XR object 302, the XR object adjuster 340 may adjust a visual property of the XR object 302 based on the deformation model 332. For example, the XR object adjuster 340 may adjust the shape and/or the texture of the XR object 302.

In some implementations, the condition may be caused by an interaction between the XR object 302 and another XR object or a force in the XR environment, such as wind. For example, when the XR object 302 collides with another XR object in the XR environment, the XR object 302 may crumple. When the XR object 302 crumples in response to a collision with the other XR object, the XR object adjuster 340 may adjust a visual property of the XR object 302 based on the deformation model 332. For example, the XR object adjuster 340 may adjust the shape and/or the texture of the XR object 302.

In some implementations, when a deformation is caused by an interaction between the XR object 302 and another XR object, the XR object adjuster 340 adjusts a visual property (e.g., texture, shape, color, etc.) of a combination of the XR object 302 and the other XR object. For example, if the deformation is caused by a collision between the XR object 302 and another XR object, the XR object adjuster 340 may combine the XR object 302 and the other XR object into a composited XR object that has crumpled portions of both the XR object 302 and the other XR object.

In some implementations, when a deformation is caused by an interaction between the XR object 302 and another XR object, the XR object adjuster 340 adjusts a visual property (e.g., texture, shape, color, etc.) of the other XR object based on the deformation model 332. For example, the XR object adjuster 340 may use the deformation model 332 to predict the effect of the XR object 302 on the other XR object. The XR object adjuster 340 may use the deformation model 332 in this way, for example, if the other XR object is also characterized by a set of response parameter values that are within a threshold range of the set of response parameter values 314 that characterizes the XR object 312.

In some implementations, when a deformation is caused by an interaction between the XR object 302 and another XR object, the XR object adjuster 340 uses a combination of two or more deformation models to predict the effect of the XR object 302 on the other XR object. For example, the deformation model obtainer 330 may obtain (e.g., receive) a deformation model for the other XR object. The XR object adjuster 340 may adjust a visual property (e.g., texture, shape, color, etc.) of the XR object 302 and/or the other XR object based on a combination of the deformation model 332 and the deformation model obtained for the other XR object.

In some implementations, the XR object adjuster 340 modifies the deformation model 332 based on a difference between the response parameter values 304 and the response parameter values 314. For example, if the XR object 302 is a representation of block cheese and the XR object 312 is a representation of shredded cheese, the XR object adjuster 340 may modify the deformation model 332 to account for the differences in response parameter values (e.g., shape, elasticity, etc.) between block cheese and shredded cheese.

In some implementations, the XR object adjuster 340 generates a modified XR object 342 that incorporates the change in the visual property of the XR object 302. The XR object adjuster 340 may provide the modified XR object 342 to an image synthesizer (e.g., the image synthesizer 240 shown in FIG. 2), which generates an image data frame that represents the XR environment with the modified XR object 342. The image synthesizer may provide the image data frame to a rendering and display pipeline. In some implementations, the image synthesizer transmits the image data frame to a device that displays the modified image data frame.

Figure 4A:
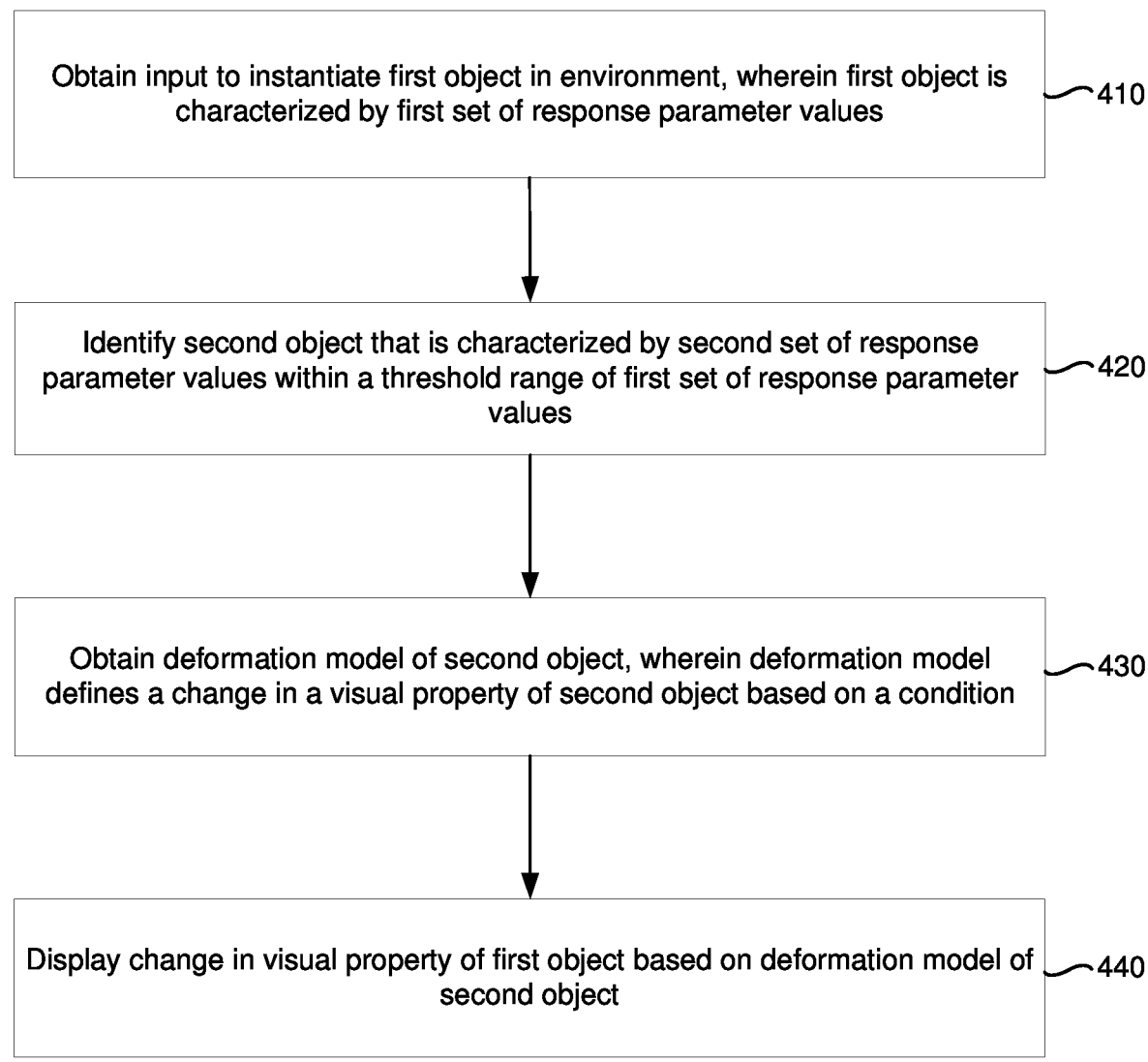
FIGS. 4A-4C are flowchart representations of a method for applying a deformation model for one object to a different object in accordance with some implementations.
Figure 4B:
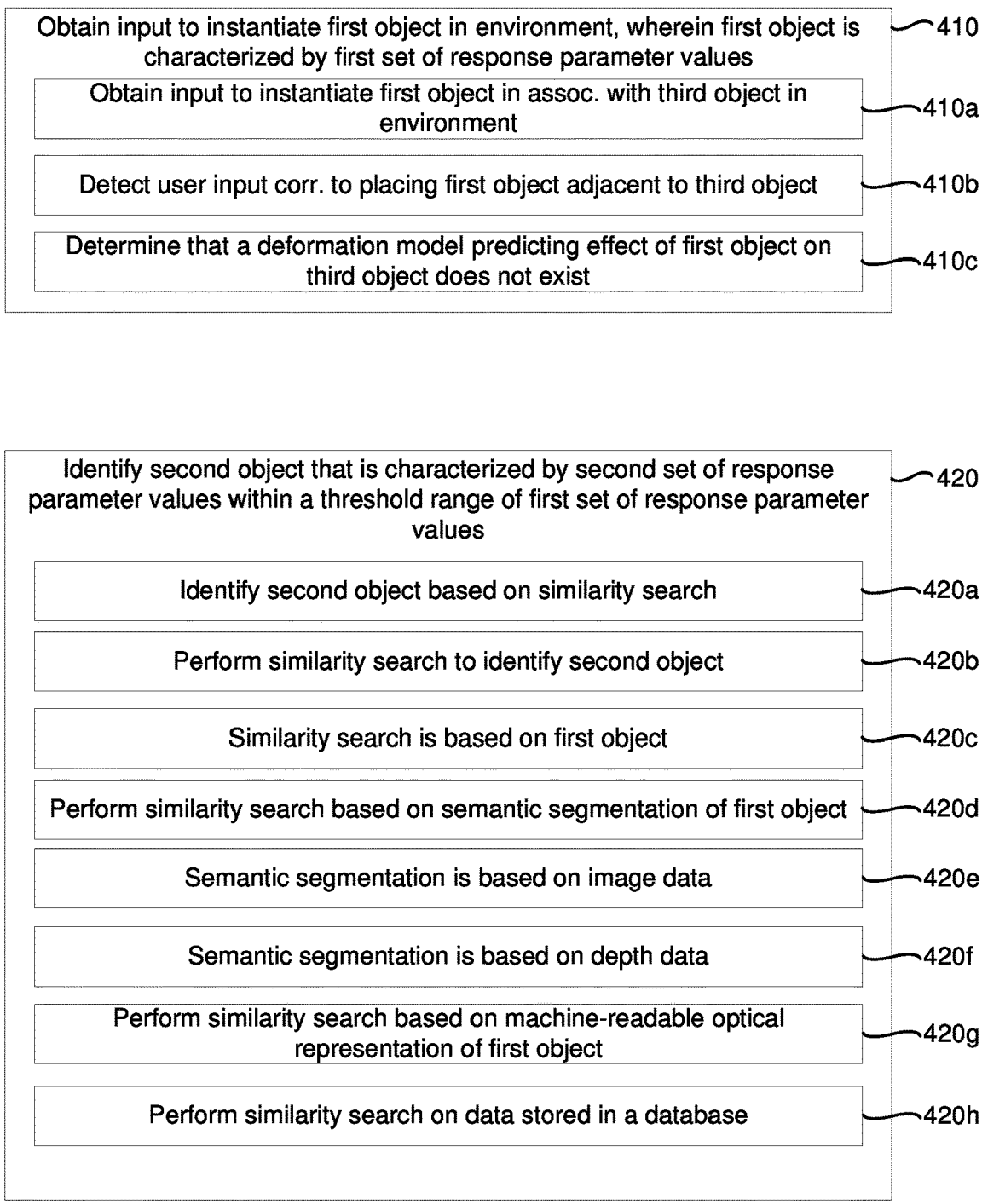
Figure 4C:
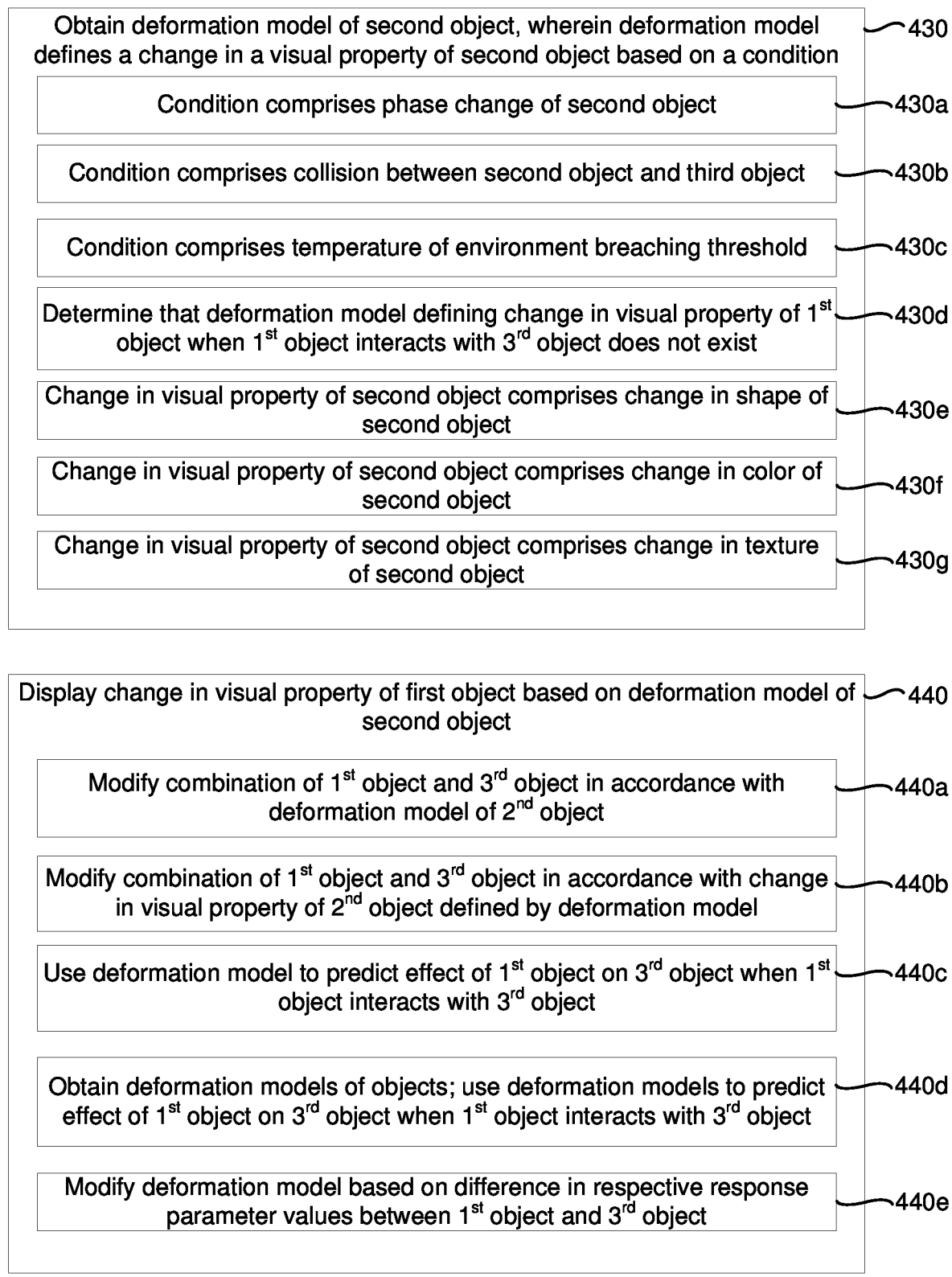

FIGS. 4A-4C are a flowchart representation of a method 400 for applying a deformation model for one XR object to a different XR object in accordance with some implementations. In various implementations, the method 400 is performed by a device (e.g., the system 200 shown in FIG. 2 and/or the deformation module 300 shown in FIG. 3). In some implementations, the method 400 is performed by processing logic, including hardware, firmware, software, or a combination thereof. In some implementations, the method 400 is performed by a processor executing code stored in a non-transitory computer-readable medium (e.g., a memory). Briefly, in various implementations, the method 400 includes obtaining an input to instantiate a first XR object in an XR environment, where the first XR object is characterized by a first set of response parameter values. The method 400 includes identifying a second XR object that is characterized by a second set of response parameter values that are within a threshold range of the first set of response parameter values, obtaining a deformation model of the second XR object that defines a change in a visual property of the second XR object based on a condition, and displaying a change in a visual property of the first XR object based on the deformation model of the second XR object.

Referring to FIG. 4A, as represented by block 410, in various implementations, the method 400 includes obtaining an input to instantiate a first XR object in an XR environment. The input may be a user input received from a user (e.g., the user 10 of FIG. 1) or may be generated by another component of the system 200. In some implementations, the emergent content engine 210 generates the input to instantiate the XR object 202.

The first XR object is characterized by a first set of response parameter values. The first set of response parameter values may characterize one or more visual aspects and/or physical properties of the first XR object. For example, if the first XR object is a representation of block cheese, the first XR object may be characterized by response parameter values such as a color parameter having a value that corresponds to the color yellow, a texture parameter having a value that corresponds to a smooth texture, an elasticity parameter having a value of 50/100, a shape parameter having a value that corresponds to a rectangular prism, and the like.

In some implementations, the input to instantiate the first XR object is generated by the system 200, e.g., by the emergent content engine 210. In some implementations, the input to instantiate the first XR object is a user input received from a user (e.g., the user 10 of FIG. 1). For example, referring to FIG. 4B, as represented by block 410a, the method 400 may include obtaining the input to instantiate the first XR object in association with a third XR object in the XR environment. In some implementations, as represented by block 410b, a user input may be detected that corresponds to placing the first XR object adjacent to the third XR object. For example, a user input may be detected that corresponds to placing a representation of block cheese adjacent to a representation of a heat source. In some implementations, as represented by block 410c, the method 400 includes determining that a deformation model that predicts an effect of the first XR object on the third XR object does not exist.

As represented by block 420, in various implementations, the method 400 includes identifying a second XR object that is characterized by a second set of response parameter values that are within a threshold range of the first set of response parameter values. For example, the system 200 may identify a second XR object representing shredded cheese and having the following response parameter values: a color parameter having a value that corresponds to the color yellow, a texture parameter having a value that corresponds to a smooth texture, an elasticity parameter having a value 60/100, and a shape parameter having a value that corresponds to strands.

In some implementations, as represented by block 420*a*, the second XR object is identified based on a similarity search. The similarity search may be performed, for example, in response to determining that the first XR object is not associated with a deformation model that defines a change in a visual property of the first XR object based on a condition. For example, if a user input is detected that corresponds to placing a representation of block cheese adjacent to a representation of a heat source, the system 200 may determine that the representation of block cheese does not have an associated deformation model that defines a change in a visual property of the block cheese based on the cheese melting.

In some implementations, as represented by block 420*b*, the method 400 includes performing the similarity search to identify the second XR object. As represented by block 420*c*, in some implementations, the similarity search is based on the first XR object. In some representations, as represented by block 420*d*, the method 400 includes performing the similarity search based on a semantic segmentation of the first XR object. As represented by block 420*e*, the semantic segmentation may be based on image data, for example, received from an image sensor. In some implementations, as represented by block 420*f*, the semantic segmentation is based on depth data received from a depth sensor.

In some implementations, as represented by block 420*g*, the similarity search may be performed based on a machine-readable optical representation of the first XR object. For example, the second XR object may be identified based on a bar code associated with the first XR object. In some implementations, the second XR object may be identified based on a QR code associated with the first XR object.

In some implementations, the similarity search may be performed based on the first set of response parameter values characterizing the first XR object. For example, as represented by block 420*h*, the similarity search may be performed on data stored in a database, e.g., to identify one or more candidate XR objects. The candidate XR objects may be characterized by respective sets of response parameter values. The sets of response parameter values may be within varying degrees of similarity to the first set of response parameter values that characterize the first XR object.

In some implementations, the similarity search returns only candidate XR objects whose corresponding response parameter values are within a threshold range of similarity to the first set of response parameter values that characterize the first XR object. In some implementations, the second XR object is the candidate XR object that is characterized by the set of response parameter values that is most similar to the first set of response parameter values that characterize the first XR object. In some implementations, some response parameter values (e.g., texture) are prioritized over other response parameter values (e.g., shape) in determining which set of response parameter values is most similar to the first set of response parameter values.

As represented by block 430, in various implementations, the method 400 includes obtaining a deformation model of the second XR object. The deformation model defines a change in a visual property of the second XR object based on a condition. The condition may be associated with the second XR object and/or with the XR environment. Referring to FIG. 4C, in some implementations, as represented by block 430*a*, the condition may include a phase change of the second XR object. For example, the condition may include the second XR object melting, freezing, boiling, or condensing, for example, in response to a change in temperature and/or pressure in the XR environment.

In some implementations, as represented by block 430*b*, the condition may include a collision between the second XR object and a third XR object. For example, a collision between the second XR object and the third XR object may result in the second XR object and/or the third XR object becoming crumpled, folded, bent, and/or crushed.

In some implementations, as represented by block 430*c*, the condition may include a temperature of the XR environment breaching a threshold. For example, if the temperature of the XR environment increases above a melting point of the second XR object, the second XR object may melt if it is in a solid phase. As another example, if the temperature of the XR environment decreases below the melting point of the second XR object, the second XR object may freeze if it is in a liquid phase.

Referring to FIG. 4C, in some implementations, as represented by block 430*d*, the method 400 includes determining that a deformation model that defines a change in a visual property of the first XR object when the first XR object interacts with a third XR object does not exist. For example, if a representation of block cheese is placed adjacent to a representation of a heat source, the system 200 may determine that the representation of block cheese does not have an associated deformation model that defines a change in a visual property of the block cheese based on an interaction with a heat source, e.g., melting.

In some implementations, as represented by block 430*e*, the change in the visual property of the second XR object may include a change in a shape of the second XR object. For example, if the second XR object is a representation of shredded cheese, the deformation model may define a change in a visual property that includes changing a strand shape to a droplet or stream shape.

In some implementations, as represented by block 430*f*, the change in the visual property of the second XR object may include a change in a color of the second XR object. For example, if the second XR object is a representation of shredded cheese, the deformation model may define a change in a visual property that includes darkening or lightening the color of the second XR object or increasing the reflectivity of the second XR object.

In some implementations, as represented by block 430*g*, the change in the visual property of the second XR object may include a change in a texture of the second XR object. For example, if the second XR object is a representation of shredded cheese, the deformation model may define a change in a visual property that includes changing a spongy texture to a liquid texture.

In various implementations, as represented by block 440, the method 400 includes displaying a change in a visual property of the first XR object based on the deformation model of the second XR object. For example, the change in the visual property may be displayed in response to a condition. In some implementations, the condition is a condition associated with the first XR object, such as melting or crumpling. In some implementations, the condition may be caused by exposure of the first XR object to an environmental condition associated with the XR environment, such as a temperature that breaches a threshold, e.g., a melting point of the first XR object. When the first XR object melts in response to the temperature of the XR environment breaching the melting point of the first XR object, a change in a visual property (e.g., shape, texture, and/or color) of the first XR object may be displayed based on the deformation model.

In some implementations, the condition may be caused by an interaction between the first XR object and a third XR object or a force in the XR environment, such as wind. For example, when the first XR object collides with a third XR object in the XR environment, the first XR object may crumple. When the first XR object crumples in response to a collision with the third XR object, a change in a visual property (e.g., shape, texture, and/or color) of the first XR object may be displayed based on the deformation model.

In some implementations, as represented by block 440a, when a deformation is caused by an interaction between the first XR object and the third XR object, the method 400 includes modifying a combination of the first XR object and the third XR object in accordance with the deformation model of the second XR object. For example, if the deformation is caused by a collision between the first XR object and the third XR object, the first XR object and the third XR object are transformed into a composited XR object that has crumpled portions of both the first XR object and the third XR object. As represented by block 440b, the combination of the first XR object and the third XR object may be modified in accordance with the change in the visual property of the second XR object defined by the deformation model. For example, the combination of the first XR object and the third XR object may be displayed with crumpled portions rendered in accordance with the crumpling patterns defined by the deformation model for the second XR object.

In some implementations, when a deformation is caused by an interaction between the first XR object and the third XR object, a visual property (e.g., texture, shape, color, etc.) of the third XR object is adjusted based on the deformation model. For example, as represented by block 440c, the deformation model may be used to predict the effect of the first XR object on the third XR object. The deformation model may be used in this way, for example, if the third XR object is also characterized by a set of response parameter values that are within a threshold range of the set of response parameter values that characterize the second XR object.

In some implementations, when a deformation is caused by an interaction between the first XR object and the third XR object, a combination of two or more deformation models may be used to predict the effect of the XR object 302 on the other XR object. For example, as represented by block 440d, the method 400 may include obtaining a deformation model for the third XR object. A combination of deformation models, e.g., the deformation models for the second XR object and the third XR object, may be used to predict the effect of the first XR object on the third XR object. A visual property (e.g., texture, shape, color, etc.) of the first XR object and/or the third XR object may be adjusted based on a combination of the deformation models for the second XR object and the third XR object.

In some implementations, as represented by block 440e, the deformation model of the second XR object is modified based on a difference between respective response parameter values between the first XR object and the second XR object. For example, if the first XR object is a representation of block cheese and the second XR object is a representation of shredded cheese, the deformation model for the representation of shredded cheese is modified to account for the differences in response parameter values (e.g., shape, elasticity, etc.) between block cheese and shredded cheese.

Figure 5:
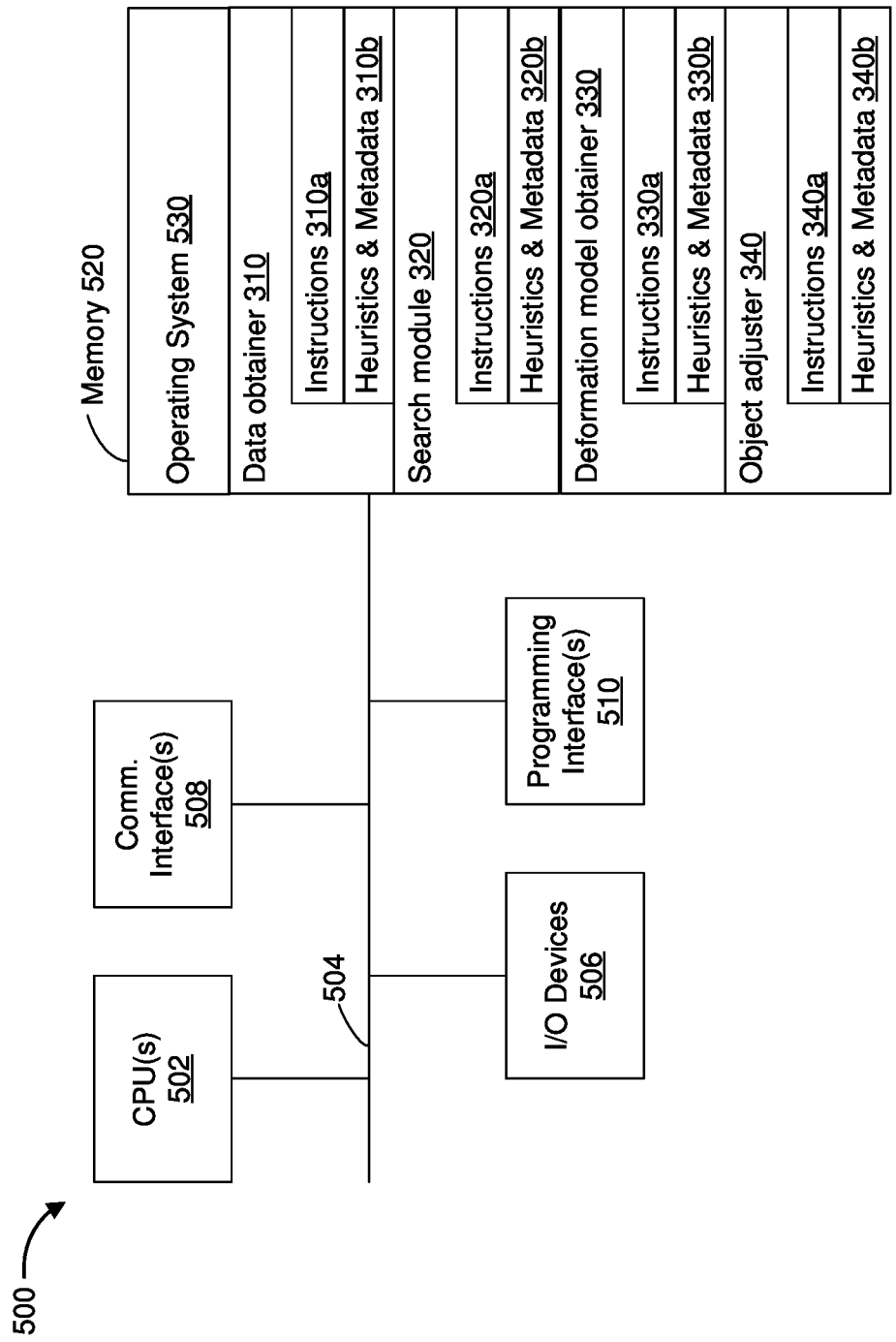
FIG. 5 is a block diagram of a device in accordance with some implementations.

FIG. 5 is a block diagram of a device 500 enabled with one or more components of a device (e.g., controller 102 and/or the electronic device 103 shown in FIG. 1) in accordance with some implementations. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the device 500 includes one or more processing units (CPUs) 502, one or more input/output (I/O) devices 506, one or more communication interface(s) 508, one or more programming interface(s) 510, a memory 520, and one or more communication buses 504 for interconnecting these and various other components.

In some implementations, the communication interface 508 is provided to, among other uses, establish, and maintain a metadata tunnel between a cloud-hosted network management system and at least one private network including one or more compliant devices. In some implementations, the one or more communication buses 504 include circuitry that interconnects and controls communications between system components. The memory 520 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. The memory 520 optionally includes one or more storage devices remotely located from the one or more CPUs 502. The memory 520 comprises a non-transitory computer readable storage medium.

In some implementations, the memory 520 or the non-transitory computer readable storage medium of the memory 520 stores the following programs, modules and data structures, or a subset thereof including an optional operating system 530, the data obtainer 310, the search module 320, the deformation model obtainer 330, and the XR object adjuster 340. As described herein, the data obtainer 310 may include instructions 310a and/or heuristics and metadata 310b for obtaining a first XR object in an XR environment. As described herein, the search module 320 may include instructions 320a and/or heuristics and metadata 320b for identifying a second XR object that is characterized by a set of response parameter values that are within a threshold range of a set of response parameter values that characterize the first XR object. As described herein, the deformation model obtainer 330 may include instructions 330a and/or heuristics and metadata 330b for receiving a deformation model of the second XR object. As described herein, the XR object adjuster 340 may include instructions 340a and/or heuristics and metadata 340b for adjusting the first XR object based on the deformation model of the second XR object.

It will be appreciated that FIG. 5 is intended as a functional description of the various features which may be present in a particular implementation as opposed to a structural schematic of the implementations described herein. As recognized by those of ordinary skill in the art, items shown separately could be combined and some items could be separated. For example, some functional blocks shown separately in FIG. 5 could be implemented as a single block, and the various functions of single functional blocks could be implemented by one or more functional blocks in various implementations. The actual number of blocks and the division of particular functions and how features are allocated among them will vary from one implementation to another and, in some implementations, depends in part on the particular combination of hardware, software, and/or firmware chosen for a particular implementation.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
    at a device including a display, a non-transitory memory, and one or more processors coupled with the non-transitory memory:
    obtaining an input to instantiate a first object in a graphical environment, wherein the first object is characterized by a first set of response parameter values;
    identifying, based on a similarity search, a second object that is characterized by a second set of response parameter values that are within a threshold range of the first set of response parameter values;
    obtaining a deformation model of the second object, wherein the deformation model defines a change in a visual property of the second object based on a condition; and
    displaying a change in a visual property of the first object based on the deformation model of the second object.

2. The method of claim 1, further comprising obtaining the input to instantiate the first object in association with a third object in the graphical environment.

3. The method of claim 2, further comprising detecting a user input corresponding to placing the first object adjacent to the third object.

4. The method of claim 2, further comprising determining that a deformation model that predicts an effect of the first object on the third object does not exist.

5. The method of claim 1, further comprising determining that the first object is not associated with a deformation model that defines a change in a visual property of the first object when the first object interacts with a third object.

6. The method of claim 1, wherein the change in the visual property of the second object comprises a change in a shape of the second object.

7. The method of claim 1, wherein the change in the visual property of the second object comprises a change in a color of the second object.

8. The method of claim 1, wherein the change in the visual property of the second object comprises a change in a texture of the second object.

9. The method of claim 1, wherein the condition comprises a phase change of the second object.

10. The method of claim 1, wherein the condition comprises a collision between the second object and a third object.

11. The method of claim 1, wherein the condition comprises a temperature of the graphical environment breaching a threshold.

12. The method of claim 1, further comprising performing the similarity search to identify the second object.

13. The method of claim 1, wherein the similarity search is based on the first object.

14. The method of claim 13, further comprising performing the similarity search based on a semantic segmentation of the first object.

15. The method of claim 14, wherein the semantic segmentation is based on image data.

16. The method of claim 14, wherein the semantic segmentation is based on depth data.

17. The method of claim 1, further comprising performing the similarity search based on a machine-readable optical representation of the first object.

18. A device comprising:
    one or more processors;
    a non-transitory memory;
    a display; and
    one or more programs stored in the non-transitory memory, which, when executed by the one or more processors, cause the device to:

obtain an input to instantiate a first object in a graphical environment, wherein the first object is characterized by a first set of response parameter values;

in response to the first object not being associated with a deformation model that defines a change in a visual property of the first object based on a condition, identify a second object that is characterized by a second set of response parameter values that are within a threshold range of the first set of response parameter values;

obtain a deformation model of the second object, wherein the deformation model defines a change in a visual property of the second object based on a condition; and display a change in a visual property of the first object based on the deformation model of the second object.

19. A non-transitory memory storing one or more programs, which, when executed by one or more processors of a device, cause the device to:

obtain an input to instantiate a first object in a graphical environment, wherein the first object is characterized by a first set of response parameter values;

in response to the first object not being associated with a deformation model that defines a change in a visual property of the first object based on a condition, identify a second object that is characterized by a second set of response parameter values that are within a threshold range of the first set of response parameter values;

obtain a deformation model of the second object, wherein the deformation model defines a change in a visual property of the second object based on a condition; and display a change in a visual property of the first object based on the deformation model of the second object.

20. The non-transitory memory of claim 19, wherein the one or more programs further cause the device to obtain the input to instantiate the first object in association with a third object in the graphical environment.

* * * * *